Sept. 10, 1957 J. SARDELLA 2,805,892
AUTOMOBILE WHEEL RIM FOR TIRES
Filed Nov. 9, 1956 2 Sheets-Sheet 1
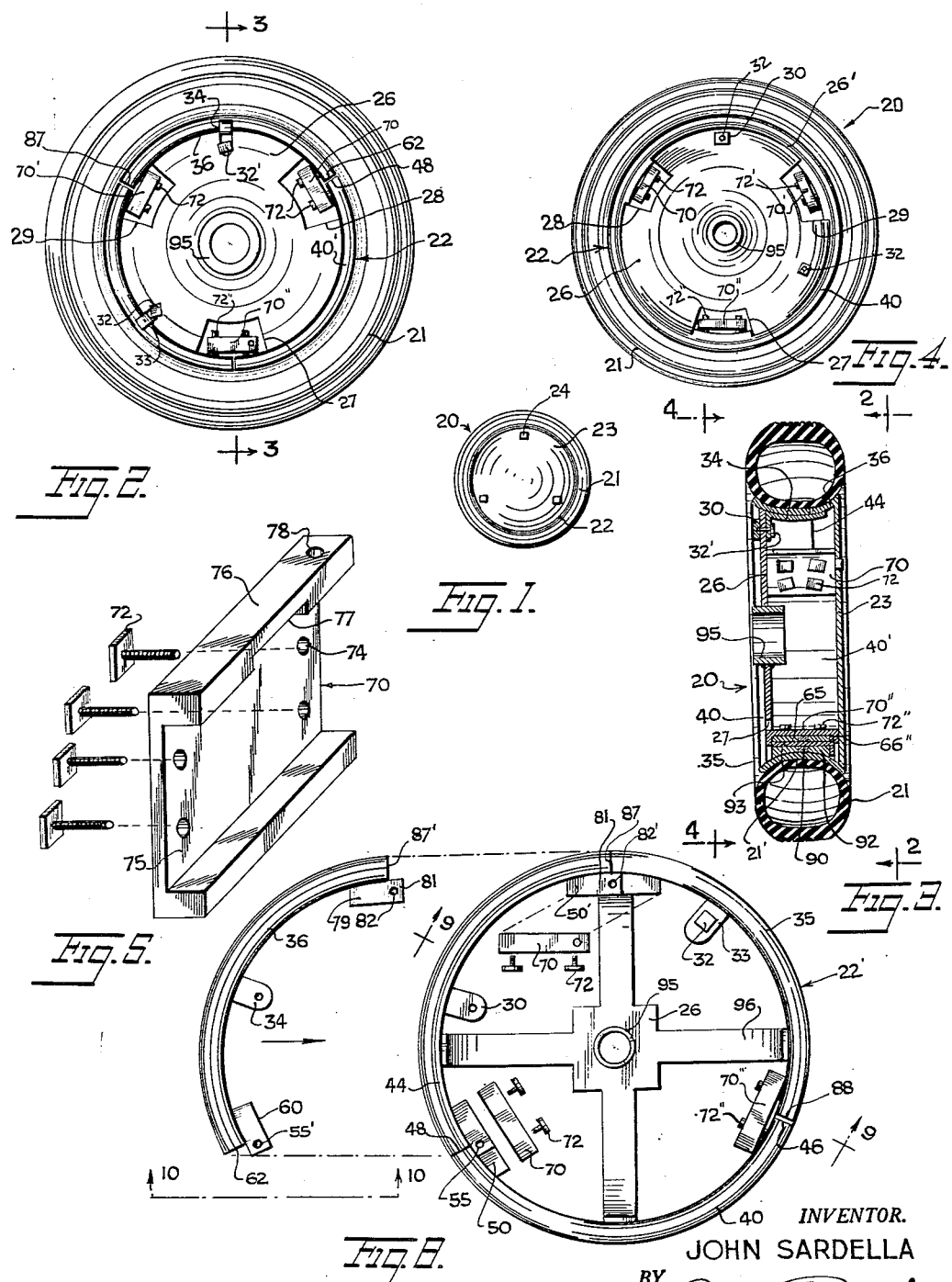
INVENTOR.
JOHN SARDELLA
BY
ATTORNEY Sept. 10, 1957  J. SARDELLA  2,805,892
AUTOMOBILE WHEEL RIM FOR TIRES
Filed Nov. 9, 1956   2 Sheets-Sheet 2
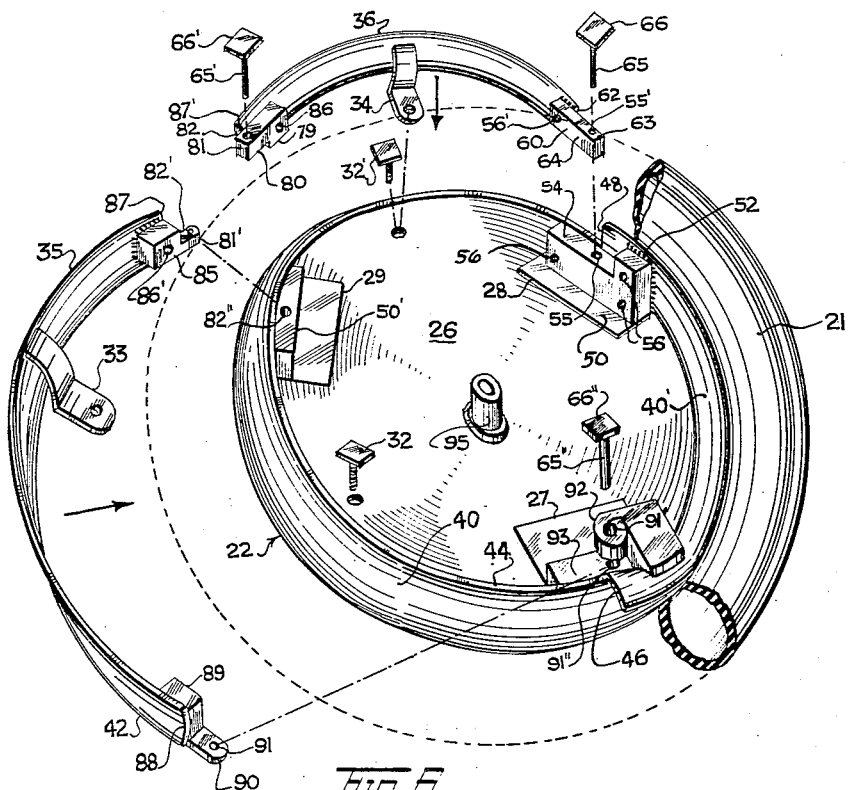
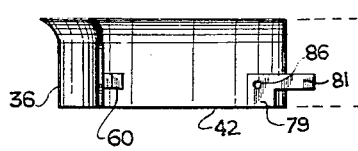
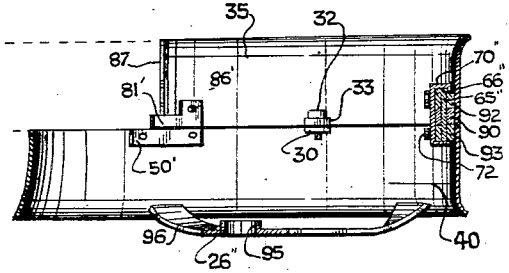
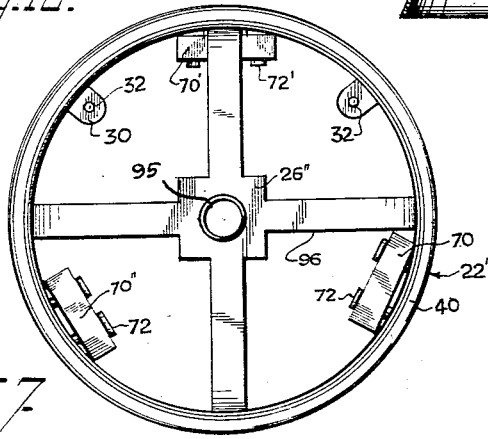
INVENTOR.
JOHN SARDELLA
BY
ATTORNEY United States Patent Office 2,805,892
Patented Sept. 10, 1957

2,805,892

AUTOMOBILE WHEEL RIM FOR TIRES

John Sardella, Bronx, N. Y.

Application November 9, 1956, Serial No. 621,385

6 Claims. (Cl. 301—31)

This invention relates to the art of vehicle wheels and particularly concerns a wheel rim for supporting a tire of an automobile, truck or the like.

The invention is directed at providing a multipart wheel rim or frame which is readily disassembled to facilitate removal of a tire while the main body of the frame remains attached to the vehicle.

Heretofore it has been necessary to remove the entire wheel from a vehicle such as an automobile, truck or bus in order to remove the tire. During the tire removal process the tire was severely strained and often struck with a hammer to release it from the conventional one-piece wheel rim. The difficult and laborious tasks of removing a tire from an automobile wheel rim and of mounting a tire on the rim have heretofore required special equipment, jigs, and tools. The need has long existed for a vehicle wheel rim or frame which would facilitate removal from and replacement on the wheel frame of a tire. Particularly needed was a wheel from which a tire could be readily removed and replaced with a simple tool such as a lug wrench.

It is therefore a principal object of the invention to provide a multipart wheel rim capable of being quickly disassembled to remove a tire mounted thereon.

It is a further object to provide a multipart wheel rim for supporting a tire, the rim including a plurality of removable arcuate sections.

It is a further object to provide a multipart wheel rim having three interlocked sections, two of the sections being arcuate concavo-convex plates, the third section being a circular ring adapted for rotation on axle and having an outwardly extending portion arranged to interfit with the other two sections.

A further object is to provide a multipart wheel frame with a novel interlocking means for the several sections thereof.

A further object is to provide novel locking means for sections of a vehicle wheel frame.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an exterior elevational view of a wheel embodying the invention.

Fig. 2 is an enlarged elevational view of the wheel with the central cover plate removed.

Fig. 3 is a vertical sectional view taken on lines 3—3 of Fig. 2.

Fig. 4 is an elevational view of the wheel taken at the inner side, as indicated by lines 4—4 of Fig. 3.

Fig. 5 is an enlarged perspective view of a clamp plate employed in the wheel.

Fig. 6 is an exploded perspective view of the wheel.

Fig. 7 is an elevational view of another form of a wheel embodying the invention.

Fig. 8 is an elevational view of the outer side of the wheel shown in Fig. 7 with a frame section shown removed therefrom.

Fig. 9 is a sectional view taken on lines 9—9 of Fig. 8.

Fig. 10 is an end view of the removed arcuate frame section of the wheel taken on lines 10—10 of Fig. 8.

In Fig. 1 is shown a wheel 20 adapted for use in an automobile, the wheel having a tire 21 carried on an annular metal wheel rim or frame 22. A circular metal disk plate 23 shown in Fig. 3 is mounted externally and concentrically on frame 22, and is secured there by a plurality of bolts 24.

In Figs. 2–6 the wheel 20 is shown on a larger scale than in Fig. 1. Plate 23 is omitted from Figs. 2–6 except Fig. 3 to show internal parts. Mounted within frame 22 is another circular disk plate 26 secured by welds 26'. This plate, as clearly shown in Fig. 3, is disposed near the inner side of the wheel. Plate 26 has three openings or cut-out portions 27, 28, 29 disposed substantially 120° apart at the perimeter of plate 26. Plate 26 carries a plurality of lugs 30 which have threaded apertures arranged to engage bolts 32, 32' inserted through holes in brackets 33, 34. Bracket 33 is attached to rim section 35. Bracket 34 is attached to rim section 36. Frame 22 includes an annular endless rim or ring 40 having an upstanding arcuate section 40'.

Frame or rim sections 35 and 36 are arcuate plates each extending angularly about 120°. The plates are shaped to fit snugly agains the inner side 21' of tire 21. The lower edges 42 of the frame sections 35, 36 are juxtaposed against the edge 44 of ring 40 when the plates are mounted on the ring. Edge 44, as shown in Fig. 6, extends about 240° between the upstanding curved ends 46, 48 of the ring section 40'. Edge 44 lies along the central peripheral line of the inner side 21' of tire 21. Plate 26 is disposed close to the inner circular edge of ring 40. Ring section 40' extends angularly about 120° around ring 40. Ring 40 and frame sections 35, 36 are concavoconvex members which provide a full 360° support for the tire 21.

Attached to ring section 40' at end 48 is a plate block 50. Weld 52 secures the plate block 50 to ring section 40'. Plate 50 has a recess 54 with an aperture 55 therein disposed about midway between the ends of the plate block 50. Three threaded apertures 56 are disposed in the sides of plate block 50. Frame section 36 carries a rectangular lug 60 at end 62. Aperture 55' is located in side 63 and aperture 56' is located in side 64. When section 36 is mounted on ring 40 as indicated by dotted lines in Fig. 6, apertures 55, 55' are in alignment. The shaft 65 of pin 66 extends through aligned apertures 55, 55'. Clamp plate 70 extends over plate block 50, lug 60 and pin 66 and locks these members together. Bolts 72 are threaded through holes 74 in clamp 70 and are engaged in the four holes 56, 56'.

Fig. 5 shows the detailed structure of clamp plate 70. The clamp plate is a channel-shaped member with a flat wall 75 in which are disposed the four spaced holes 74 through which the shanks of bolts 72 are passed. One side 76 of plate 70 has a recess 77 intended to receive the rectangular head of pin 66. A threaded aperture 78 is provided in side 76 for receiving the threaded shank of one bolt 24. The clamp plate 70 terminates at cut-out portion 28 of plate 26.

At the opposite end of frame section 36 is a plate 79 which has a recess 80 forming an outwardly extending lug or finger 81. This finger has an aperture 82 arranged to receive the shaft 65' of pin 66'. Frame section 35 has a similar plate 85 welded thereon. Thus plate 85 has a lug or finger 81' arranged to underlie finger 81 with aperture 82' in finger 81' disposed in alignment with aperture 82, and with shaft 65' extending therethrough. Holes 86, 86' are disposed in plates 79, 85 and receive two of bolts 72' therein. A plate block 50' having an aperture 82'' is secured to ring 40 about 120° from edges 46 and 48. Clamp plate 70' serves to secure the superimposed plate block 50' and lugs 81 and 81' together. The shaft 65' passes through apertures 82, 82' and 82''. By this arrangement the adjacent edges 87, 87' of frame sections 35, 36 are held in substantial abutment.

At end 88 of plate 23 is a plate 89 having a lug or finger 90 extending therefrom. This finger has an aperture 91. Secured to ring section 40' at end 46 is a plate block 93 having a lug 92 with an aperture 91' arranged to overhang the base of plate 93 and the aperture 91'' therein. Finger 90 fits between lug 92 and the base of plate 93, with plate 89 abutting the lug 92. Apertures 91, 91' and 91'' are thus disposed in alignment so that shaft 65'' of pin 66'' passes through the aligned apertures. Clamp plate 70'' couples the plates 89, 93. Bolts are threaded in apertures in plates 89, 93 through holes in clamp plate 70''. A sleeve bearing or bushing 95 is mounted centrally in plate 26 and is intended to receive the end of an axle on which the wheel is to rotate.

When the wheel 20 is fully assembled as shown in Figs. 1–4, the following sequence of steps is used to remove tire 21. First the three bolts 24 are removed to release plate 23. Then the four bolts 72, the single bolt 32 and the four bolts 72' are removed. Clamp plates 70 and 70' are thus freed and can be removed. This exposes pins 66, 66' which are now removed. Rim section 36 is now fully released and is lifted off from the wheel. Bolts 32 and 72'' are now removed. Clamp plate 70'' and pin 66'' are now removed. This releases rim section 35 which is now only engaged at the end 46 of ring section 40'. The tire 21 can now be easily lifted off from ring 40 since only the 120° ring section 40' is fully in engagement with the inside of the tire. The remaining 240° section of ring 40 is engaged with only the inner half of the inside tire surface 21'. The tire 21 may be replaced on the wheel and securely locked thereby reversing the removal procedure for the several members. Since only three sets of four bolts hold the clamp plates and only two bolts in brackets 33, 34 secure the frame sections to plate 26, the tire is very quickly released for demounting and just as quickly attached.

In Figs. 7–10 the invention is shown embodied in a truck or bus type of wheel rim or frame 22'. This form of wheel rim is similar to that of the automobile type of wheel rim 22. Parts in Figs. 7–10 corresponding to similar parts in Figs. 1–6 are identically numbered. Bearing 95 is formed centrally in plate 26'' which has curved radially extending arms 96 secured to the inner side of ring 40. The procedure for assembly and disassembly of the wheel rim 22' is the same as for the wheel rim 22.

It is to be understood that a suitable cover should be provided to cover the rim in order to protect the device from dust.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A wheel rim, comprising a circular annular frame, said frame having an outwardly extending arcuate portion having an angular length less than 180°, a pair of arcuate sections having interfitted adjacent ends, said sections having outer ends interlocked with opposite ends of said portion, said sections each having one longitudinal edge abutting said frame between the ends of said portion, a first disk plate secured to said frame near one side thereof, said plate having a central aperture adapted to receive an axle, and a second disk plate removably mounted at the other side of the frame concentric with said arcuate portion and said sections.

2. A wheel rim, comprising a circular annular frame, a first disc plate secured to the frame near one side thereof, said frame having an outwardly extending portion at the opposite side thereof, said portion having an angular length less than 180°, a pair of arcuate sections, each section having an apertured lug extending from one end thereof, said lugs being interfitted with each other, a plurality of apertured plate blocks disposed on said frame, one of said blocks having an aperture disposed in alignment with the apertures in said lugs, a first pin lodged in the aligned apertures, a first clamp plate disposed over said lugs, pin and said one plate block and secured thereto by bolts threaded therein, one of said sections having another apertured lug extending from the other end thereof, said other lug being juxtaposed to a second one of said blocks with the apertures in said other lug and second block disposed in alignment and having a second pin lodged therein, a second clamp plate disposed over said other lug, second plate block and second pin and secured thereto by threaded bolts, the other of said sections having an apertured plate with an apertured finger extending therefrom, said finger being interfitted between an apertured extension and an apertured base portion of a third one of said plate blocks, a third pin lodged in the aligned apertures in the finger extension and base portion with a third clamp plate secured thereover by a plurality of bolts, said first disc plate being formed with a centrally disposed cylindrical wheel bearing, a bracket centrally disposed on each of said pair of sections and detachably secured to said first plate, and a cover plate removably secured on the other side of said annular frame by bolts threaded in the clamp plates, said clamp plates being disposed at equally spaced cut-out portions of said first plate.

3. A wheel rim, comprising a circular annular frame, a first disc plate secured to the frame near one side thereof, said frame having an outwardly extending arcuate portion at the opposite side thereof, said portion having an angular length of about 120°, a pair of arcuate substantially 120° sections, each section having an apertured lug extending from one end thereof, said lugs being interfitted with each other, a plurality of apertured plate blocks disposed on said frame, one of said blocks having an aperture disposed in alignment with the apertures in said lugs, a first pin lodged in the aligned apertures, a first clamp plate disposed over said lugs, pin and said one plate block and secured thereto by bolts threaded therein, one of said sections having another apertured lug extending from the other end thereof, said other lug being juxtaposed to a second one of said blocks with the apertures in said other lug and second block disposed in alignment and having a second pin lodged therein, a second clamp plate disposed over said other lug, second plate block and second pin and secured thereto by threaded bolts, the other of said sections having an apertured plate with an apertured finger extending therefrom, said finger being interfitted between an apertured extension and an apertured base portion of a third one of said plate blocks, a third pin lodged in the aligned apertures in the finger extension and base portion with a third clamp plate secured thereover by a plurality of bolts, said first disc plate being formed with a centrally disposed cylindrical wheel bearing, a bracket centrally disposed on each of said pair of sections and detachably secured to said first plate, and a cover plate removably secured on the other side of said annular frame.

4. A wheel rim, comprising a circular annular frame, a disc plate secured to the frame near one side thereof, said frame having an outwardly extending arcuate portion at the opposite side thereof, said portion having an angular length less than 180°, a pair of substantially equal arcuate sections, each section having an apertured lug extending from one end thereof, said lugs being interfitted with each other, a plurality of apertured plate blocks disposed on said frame, one of said blocks having an aperture disposed in alignment with the apertures in said lugs, a first pin lodged in the aligned apertures, a first clamp plate disposed over said lugs, pin and said one plate block and secured thereto by bolts threaded therein, one of said sections having another apertured lug extending from the other end thereof, said other lug being juxtaposed to a second one of said blocks with the apertures in said other lug and second block disposed in alignment and having a second pin lodged therein, a second clamp plate disposed over said other lug, second plate block and second pin and secured thereto by threaded bolts, the other of said sections having an apertured plate with an apertured finger extending therefrom, said finger being interfitted between an apertured extension and an apertured base portion of a third one of said plate blocks, a third pin lodged in the aligned apertures in the finger extension and base portion with a third clamp plate secured thereover by a plurality of bolts, said disc plate being formed with a centrally disposed cylindrical wheel bearing, and a bracket centrally disposed on each of said pair of sections and detachably secured to said disc plate.

5. A wheel rim, comprising a circular annular frame, a first plate having radial arms secured to the frame near one side thereof, said frame having an outwardly extending portion at the opposite side thereof, said portion having an angular length less than 180°, a pair of substantially equal arcuate sections, each section having an apertured lug extending from one end thereof, said lugs being interfitted with each other, a plurality of apertured plate blocks disposed on said frame, one of said blocks having an aperture disposed in alignment with the apertures in said lugs, a first pin lodged in the aligned apertures, a first clamp plate disposed over said lugs, pin and said one plate block and secured thereto by bolts threaded therein, one of said sections having another apertured lug extending from the other end thereof, said other lug being juxtaposed to a second one of said blocks with the apertures in said other lug and second block disposed in alignment and having a second pin lodged therein, a second clamp plate disposed over said other lug, second plate block and second pin and secured thereto by threaded bolts, the other of said sections having an apertured plate with an apertured finger extending therefrom, said finger being interfitted between an apertured extension and an apertured base portion of a third one of said plate blocks, a third pin lodged in the aligned apertures in the finger extension and base portion with a third clamp plate secured thereover by a plurality of bolts, said first plate being formed with a centrally disposed cylindrical wheel bearing, and a bracket centrally disposed on each of said pair of sections and detachably secured to bracket members on said frame.

6. A wheel rim, comprising a circular annular frame, said frame having an outwardly extending portion at the opposite side thereof, said portion having an angular length less than 180°, a pair of arcuate sections, each section having an apertured lug extending from one end thereof, said lugs being interfitted with each other, a plurality of apertured plate blocks disposed on said frame, one of said blocks having an aperture disposed in alignment with the apertures in said lugs, a first pin lodged in the aligned apertures, a first clamp plate disposed over said lugs, pin and said one plate block and secured thereto by bolts threaded therein, one of said sections having another apertured lug extending from the other end thereof, said other lug being juxtaposed to a second one of said blocks with the apertures in said other lug and second block disposed in alignment and having a second pin lodged therein, a second clamp plate disposed over said other lug, second plate block and second pin and secured thereto by threaded bolts, the other of said sections having an apertured plate with an apertured finger extending therefrom, said finger being interfitted between an apertured extension and an apertured base portion of a third one of said plate blocks, and a third pin lodged in the aligned apertures in the finger extension and base portion with a third clamp plate secured thereover by a plurality of bolts.

References Cited in the file of this patent

UNITED STATES PATENTS

| | | |
|---|---|---|
| 1,152,160 | Fitzgerald | Aug. 31, 1915 |
| 1,499,566 | Volz | July 1, 1924 |
| 1,698,022 | Macgillivray | Jan. 8, 1929 |